United States Patent [19]

Bichsel et al.

[11] Patent Number: 5,043,171
[45] Date of Patent: * Aug. 27, 1991

[54] MINERAL ENRICHED SUGAR BEET

[75] Inventors: Stanley E. Bichsel; Michael F. Cleary; Roland F. Olson, all of Fargo, N. Dak.

[73] Assignee: American Crystal Sugar Company, Moorhead, Minn.

[ * ] Notice: The portion of the term of this patent subsequent to Jul. 3, 2007 has been disclaimed.

[21] Appl. No.: 535,394

[22] Filed: Jun. 8, 1990

Related U.S. Application Data

[63] Continuation of Ser. No. 1,755, Jan. 9, 1987, Pat. No. 4,938,974.

[51] Int. Cl.$^5$ .............................................. A23L 1/304
[52] U.S. Cl. ...................................... 426/74; 426/615
[58] Field of Search ............... 426/74, 615, 271, 267, 426/270, 623, 635, 641

[56] References Cited

U.S. PATENT DOCUMENTS

| 1,448,512 | 3/1923 | Benjamin . | |
| 2,155,361 | 4/1939 | Myers | 167/68 |
| 2,191,835 | 2/1940 | Snelling | 99/100 |
| 2,259,767 | 10/1941 | Myers | 99/100 |
| 2,426,076 | 8/1947 | Zenzes | 99/141 |
| 2,448,152 | 8/1948 | Patton | 99/100 |
| 2,531,431 | 11/1950 | Hills | 99/100 |
| 2,893,878 | 7/1959 | Simon et al. | 99/207 |
| 3,365,297 | 1/1968 | Burgess et al. | 99/2 |
| 3,734,773 | 5/1973 | Haley | 127/48 |
| 3,754,938 | 8/1973 | Ponting | 99/154 |
| 3,895,119 | 7/1975 | Grom | 426/267 |
| 3,928,121 | 12/1975 | Zepeda-Castillo | 162/14 |
| 3,937,846 | 2/1976 | Teissier | 426/635 |
| 4,076,552 | 2/1978 | Farag et al. | 127/50 |
| 4,143,169 | 3/1979 | Skoch et al. | 426/307 |
| 4,241,093 | 12/1980 | Farag et al. | 426/258 |
| 4,273,590 | 6/1981 | Cronewitz et al. | 127/44 |
| 4,314,854 | 2/1982 | Takagi | 127/37 |
| 4,379,782 | 4/1983 | Staub et al. | 424/180 |
| 4,432,806 | 2/1984 | Madsen et al. | 127/48 |
| 4,451,489 | 5/1984 | Beale et al. | 426/254 |
| 4,479,978 | 10/1984 | Robertiello et al. | 426/636 |
| 4,555,270 | 11/1985 | Ponant | 127/44 |
| 4,789,551 | 12/1988 | Sayle | 426/623 |
| 4,795,653 | 1/1989 | Bommarito | 426/615 |
| 4,818,549 | 4/1989 | Steiner et al. | 426/262 |
| 4,882,190 | 11/1989 | Olson et al. | 426/541 |
| 4,911,940 | 3/1990 | Steiner et al. | 426/267 |
| 4,938,974 | 7/1990 | Bechsel | 426/74 |

FOREIGN PATENT DOCUMENTS

| 2587723 | 3/1987 | France . |
| 57-54573 | 4/1982 | Japan . |
| 58-9665 | 1/1983 | Japan . |
| 1555647 | 11/1979 | United Kingdom . |

OTHER PUBLICATIONS

R. D. Williams et al., *J. Nutr.*, 11, 433 (1936) "The Effect of Cellulose, Hemicellulose and Lignin . . . Laxation in Man".
B. K. Watt et al., *Composition of Foods* (Agriculture Handbook No. 8), Dec. 1963, U.S. Dep't of Agriculture.
A. E. Goodban et al., *Journal of the A.S.S.B.T.*, 13, 556 (1965).
K. L. Kapur et al., *Indian Food Packer*, "Non-Traditional Uses of Sugarbeet", p. 40 (1977).
J. Tredger et al., *Diabete & Metabolisme*, 7, 169 (1981).
G. V. Genie, *Sugar Technology Reviews*, Elseview Publishing Co., vol. 9, Juice Extraction in the Beet Sugar Factor, pp. 217, 228, 263, and 266 (Jul. 1982).
E. Leclercq, *Process Biochemistry*, Jun. 1985, p. 75.
H. Graham et al., *J. Nutr.*, 116, 242 (1986).
"Bakers Boost 'Light' Category", *Milling & Baking News*, Feb. 1986, p. 40.
"Fibrex", product information brochure.
*Kirk-Othmer Encyclopedia of Chemical Technology*, Third Edition, vol. 19, Pulp, pp. 413-415.
A. H. Bausier et al., *La Sucrerie Belge*, 96, 371-384 (1977).
J. M. Randall et al., *ASAE Publication*, No. 5-81, 654-659 (1981).
J. Studnicky et al., *Listy Cukrovarnicke*, 97, 186-189 (1981).
J. M. Randall et al., *Zuckerind.*, 107, 38-46 (1982).
P. Kelly, *Animal Feed Science and Technology*, 8 1-18 (1983).

Primary Examiner—Carolyn Paden
Attorney, Agent, or Firm—Merchant, Gould, Smith, Edell, Welter & Schmidt

[57] ABSTRACT

Mineral enriched sugar beets as a nutritional source of dietary fiber made by contacting, in an aqueous environment, sugar beets and an assimilable source of the mineral.

18 Claims, No Drawings

MINERAL ENRICHED SUGAR BEET

The present application is a continuation of U.S. Ser. No. 07/001,755, filed Jan. 9, 1987 presently pending and ultimately issued as U.S. Pat. No. 4,938,974.

FIELD OF THE INVENTION

Broadly, the invention relates to nutritionally enriched sources of dietary fiber. More specifically, the invention relates to mineral enriched sugar beet as a nutritional source of dietary fiber.

BACKGROUND OF THE INVENTION

In response to studies which indicate that an increase in the consumption of dietary fiber may decrease the risk of developing specific health problems (i.e., cancer of the colon), many individuals have been adding foods having a high fiber content to their diet. In order to meet this demand for foods having a high fiber content, many food processors are increasing the fiber content of foods by adding bran. Bran is the cleaned husks of cereal grains such as wheat, corn and rice. Other sources of dietary fiber are known and include sugar beets, citrus peels, apple pomace and sawdust, but for reasons of consumer appeal, low cost, ease of availability and ease of use, bran is the most commonly used source.

In addition to being more conscious about the consumption of foods having a high proportion of dietary fiber, people are also more conscious about a food's nutritional value. Unfortunately, many of the processed foods consumed by the general public are nutritionally poor and must be nutritionally supplemented. Unfortunately, to the best of my knowledge, most known sources of dietary fiber are nutritionally poor. Therefore, in order to meet the demands for both high fiber content and high nutritional value it is typical, when possible, to add both bran and nutrition supplements.

Accordingly, a need exists for a nutritional source of dietary fiber which may be incorporated into processed foods without adversely affecting the taste, texture, flavor or aroma of the foods.

SUMMARY OF THE INVENTION

In a first aspect, the invention is a nutritionally enriched source of dietary fiber comprising sugar beet which has been intentionally supplemented with (i) a nutritional amount of at least one mineral selected from the group consisting of iron, magnesium, copper, zinc, manganese, and potassium, and/or (ii) calcium in an amount of at least about 2 wt. %, based upon the source of dietary fiber.

In a second aspect, the invention is a process of making the nutritionally enriched source of dietary fiber described above by combining sugar beet and an assimilable source of a mineral such that the sugar beet absorbs and retains a nutritional amount of the mineral; the mineral selected from the group consisting of iron, magnesium, copper, zinc, manganese, potassium, and combinations thereof.

In a second embodiment of the second aspect, the invention is a process of making the calcium enriched source of dietary fiber described above by combining sugar beet and an assimilable source of calcium such that the sugar beet absorbs and retains calcium in an amount of at least about 2 wt. %, based upon the source of dietary fiber.

As utilized herein, (i) the term "sugar beet" refers to the root of the common beet Beta Vulgaris from which sugar is commercially extracted; (ii) the term "whole sugar beets" refers to sugar beet roots which contain all of their original component parts (i.e. "whole sugar beets" are sugar beets which have not been processed so as to extract one or more of the sugar beets' component parts); (iii) the term "processed sugar beets" refers to sugar beets from which the sugar component has been extracted; (iv) the term "mineral" refers to those nutritionally important minerals required for human health; a nonexhaustive list of which includes iron, magnesium, copper, zinc, manganese, potassium, and calcium; (v) term "nutritional amount" refers to an amount which, when assimilated into the human body, aids in the proper functioning thereof; and (vi) the term "farinaceous" refers to compounds which are made from, rich in, or consist of starch or have a mealy or powdery texture.

DETAILED DESCRIPTION OF THE INVENTION INCLUDING A BEST MODE

I have discovered that a substantially bland, mineral enriched source of dietary fiber may be made by combining sugar beet and an assimilable source of a mineral.

The sugar beet is a form of the common beet Beta Vulgaris which is commercially grown in large quantities and processed for its sugar content. While dependent upon the particular species and growing conditions, whole mature sugar beets typically consist of about 14-20 wt. % sugar, 1-2 wt. % pectin, 70-80 wt. % water, and minor amounts of other components such as amino acids, minerals, etc. The portion of the sugar beet remaining after commercial extraction of the sugar therefrom is known as sugar beet pulp and is generally sold as a livestock feed bulking agent. I have found that both whole sugar beet and sugar beet pulp may be enriched with a mineral and used as a mineral enriched source of dietary fiber. Further, the whole sugar beet may be used as a substitute for sugar.

I have discovered that sugar beets may be enriched with a mineral by simply contacting the sugar beets with an assimilable source of the mineral. As is apparent in the Examples, this indicates that processes of enriching the sugar beets according to the present invention do not require any additional step of reacting the enriched sugar beet composition with a chemical composition to further chemically modify the nature of the absorbed mineral. A nonexhaustive list of minerals and assimilable sources thereof which may be used includes: iron from such sources as iron chloride; magnesium from such sources as magnesium oxide; copper from such sources as copper chloride; zinc from such sources as zinc acetate; manganese from such sources as manganese chloride; potassium from such sources as potassium chloride; and calcium from such sources as lime and calcium hydroxide.

While not intending to be limited thereby, we believe that the minerals are absorbed and retained within the sugar beet by ionic bonding of the minerals onto the pectin of the sugar beet. The mineral is retained by the pectin in such a form that it is not readily released during processing, shipping, and storage but is readily assimilated.

The first step in manufacturing the mineral enriched source of dietary fiber is to clean the sugar beet by removing soil and blemishes therefrom. A useful method of cleaning the sugar beet is to subject the beet to a high pressure water spray and then hand-trim the sugar beet to remove the crown and any remaining blemishes and soiled areas. The cleaned sugar beet may then be combined with a source of a mineral or, preferably, may first be cut into several pieces in order to increase the surface area and speed up absorption of the mineral. Since most sugar beet processing plants slice sugar beets into what are known as cossettes, the sugar beets are most preferably sliced into cossettes before being treated with the source of mineral.

Preferably, a substantial portion of the skin of the sugar beet is removed during cleaning in order to increase the blandness of the final product. The skin may be removed in any of the well known conventional methods including high pressure water spray and mechanical peeling.

The source of mineral may be introduced into the sugar beet in any manner which results in the absorption of a nutritional amount of the mineral into the sugar beet. Preferably, the sugar beet or beet cossettes are contacted with an aqueous source of the mineral to produce an enriched sugar beet material.

The weight ratio of source of mineral to sugar beet can vary so greatly depending upon the particular mineral to be absorbed, the particular source of the mineral, the desired concentration of mineral in the final product, etc., that a generalization of desired ratios would simply not be meaningful. The preferred ranges of mineral content, based upon the total composition, for each specific mineral with which the sugar beet is intentionally supplemented, however, are: (i) about 0.2 to 0.4 wt. % iron; (ii) abut 1 to 2 wt. % magnesium; (iii) about 0.1 to 0.3 wt. % copper; (iv) about 0.1 to 0.3 wt. % zinc; (v) about 0.1 to 0.3 wt. % manganese; (vi) about 2 to 4 wt. % potassium; (vii) about 2 to 10 wt. % calcium (most preferably about 2 to 6 wt. %); or (viii) a combination thereof. Such percentages are readily obtainable according to general processes described herein.

The duration of contact between the sugar beet and the source of mineral should be sufficient to ensure that the sugar beet has absorbed the desired amount of mineral. The duration of contact required to attain the desired amount of mineral in the sugar beet depends upon the particular mineral to be incorporated into the sugar beet, the particular source of mineral used, the concentration of mineral in the mixture or blend, etc. Again, due to these variables, the desired duration of contact between the sugar beet and the source of mineral varies so greatly that a generalization of the desired duration of contact would simply not be meaningful however, a contact time of at least about 10 minutes is generally preferred.

I have found that the processing of whole sugar beet in accordance with my invention may result in the extraction of sugar therefrom if the process is carried out at a temperature above about 50° C. Accordingly, when it is desired to retain the sugar within the final product, the whole sugar beet and the source of mineral should be combined at a temperature below about 50° C., preferably at a temperature between about 20° to 30° C.

Further, I have found that when employing lime, such as a 1 to 20 wt. % lime slurry, to nutritionally enrich the sugar beet with calcium the use of very basic pH's of 8 or above and temperatures above about 30° C. result in a breakdown of the pectin in the sugar beet resulting in a substantially water soluble product, which is difficult to work with whereas the use of very basic pH's (8 or above) and temperatures below about 10° C. result in increased mineral absorption.

After combining the sugar beet and the source of mineral for a period of time sufficient to ensure absorption of the desired amount of mineral within the sugar beet, the source of mineral and the sugar beet are separated, excess source of mineral removed from the sugar beet, and the mineral enriched sugar beet is dried. When combined in an aqueous environment, excess solution is preferably removed from the sugar beet by compression.

The sugar beet may be dried in any of a number of conventional methods including air drying, oven drying, fluidized bed drying, etc. The drying temperature should be kept below about 200° C. to prevent burning or scorching of the mineral enriched sugar beets. Preferably, the sugar beets are dried in a fluidized bed having an air temperature of about 100°–200° C., to a moisture content of less than about 10 wt. %, based upon the sugar beet pieces after drying. I have further discovered that the use of drying temperatures above about 200° C. tends to discolor the enriched sugar beets and, while such discoloration does not appear to affect the nutritional value or flavor of the mineral enriched sugar beets, it does result in a rather unappetizingly discolored product.

Because the final product is intended for human consumption, the equipment and surrounding environment must be kept clean and sanitized to avoid contamination of the product. Further, the equipment must be constructed and designed so as to reduce the risk of contamination and should be made of a material which does not contribute an unpleasant taste or odor to the final product. An example of a suitable material is stainless steel.

Preferably, the mineral enriched sugar beet is milled to a soft, fine powder. I have found that the product obtained from whole sugar beets is easily milled into a flour while the product obtained from processed sugar beets is more fibrous and tends to be difficult to mill. Hence, it may take more drastic measures to mill the mineral enriched sugar beet made from processed sugar beets.

The final product may be packaged and sold to food processors and consumers without further processing or it may be conveniently blended with a farinaceous compound such as a grain or whole grain or gelatin and sold in ready-to-use form.

A nonexhaustive list of farinaceous compounds with which the mineral enriched sugar beet may be blended includes grains such as corn, oats, wheat, rice, rye, barley, malt, sorghum, soybeans, pinto beans, sunflower seeds, and millet; nuts such as peanuts, walnuts, almonds, pecans, cashews and acorns; yeast; potatoes; arrowroot; bran; beans; peas; casava root; Jerusalem artichokes; and, combinations thereof.

I have found that the mineral enriched sugar beet often tends to alter the taste and mouth feel of foods which use it and therefore should be used sparingly. Generally, I have found that a ratio of farinaceous compound or gelatin to mineral enriched sugar beet of about 50:1 to about 10:1 results in foods having a nutritional amount of the mineral enriched sugar beet, without adversely affecting the taste, texture, flavor, or aroma of the food.

The blend of mineral enriched sugar beet and farinaceous compound or gelatin may be combined with at least one additional edible ingredient to form any of a number of food products. A nonexhaustive list of such additional edible ingredients includes milk and milk by-products such as cheese, whey, and butter; eggs; margarine; sugar; baking powder; cooking oil; fruits such as apples, oranges, bananas, grapes, cantelope, watermelon, kiwi fruit, peaches, pears, strawberries, raspberries, blackberries, raisins and dates; chocolate; and spices such as cinnamon, garlic, pepper, nutmeg and cloves.

Nearly any food product which must be or can incorporate a farinaceous component may incorporate the mineral enriched sugar beet. While the number of such food products is quite large, an illustrated list of food products which may conveniently incorporate the mineral enriched sugar beet in order to increase the nutritional value of the food product includes biscuits, bread crumbs, breading (for coating fish, chicken, cheese rolls, nut rolls), breads (yeast, soda, nonrising), breakfast cereals (hot and cold), cakes, cake mixes, candy bars, cookies, corn chips, crackers, croutons, doughnuts, fiber supplement tablets, frosting, fruitcake, granola, granola bars, gravy, gravy mix, instant breakfast mix, muffins, pancake and waffle mix, pasta, pastries, pemmican, pesto, pie crust, pie filling, potato chips, pretzels, puddings, salad dressing, salsa, sauces, sauce mixes, texturized meats, whole bran, bran mix, yogurt, etc.

EXAMPLE I

Calcium-Enriched Sugar Beet Cossettes Sugar Retained 127.4 lbs. of frozen sugar beets were washed with a water spray in a roller drum washer wherein about 50% of the sugar beet peels were removed. The beets were then trimmed by removing the top ½ to ¾ inch of the beet, blemishes and residual dirt retained in crevices. 108.8 lbs. of washed and trimmed beets were obtained.

The cleaned beets were then processed in two separate batches. In Batch #1, 39.8 lbs. of the washed and trimmed beets were sliced into cossettes over a 15 minute period using a slicing machine equipped with two sets of Putsch knives. The cossettes were immersed in 64.8 lbs. of a 2% lime slurry. The cossettes acquired a greenish yellow appearance immediately upon immersion in the lime slurry. ; The lime slurry cooled from room temperature to 3° C. shortly after immersion of the cossettes. The cossettes were immersed in the lime slurry for 40 minutes and were then pressed through a cheese cloth over a 30 minute period to remove excess lime slurry. 54.6 lbs. of pressed cossettes were obtained.

In Batch #2, 69.0 lbs. of the washed and trimmed beets were sliced into cossettes over an 8 minute period using the same slicing machine used to slice Batch #1. The cossettes were immersed in 90.0 lbs. of a 2% lime slurry. The cossettes acquired a greenish yellow appearance immediately upon immersion in the lime slurry. The lime slurry cooled from room temperature to 3° C. shortly after immersion of the cossettes. The cossettes were immersed in the lime slurry for 97 minutes and were then pressed through a cheese cloth over a 53 minute period to remove excess lime slurry. 100.2 lbs. of pressed cossettes were obtained.

One hour later both batches were combined and then split again into two different batches of approximately equal weight. The first batch of lime treated cossettes was charged into a natural gas heated fluidized bed dryer and dried for two hours at an air inlet temperature of 150° C. The drying process was then repeated for the second batch.

14.4 lbs. of a light-tan shredded product having a moisture content of 1 wt. % was produced.

EXAMPLE II

Calcium Enriched Sugar Beet Cossettes Sugar Retained

Frozen sugar beets were washed with a water spray in a roller drum washer wherein about 50% of the sugar beet peels were removed. The beets were then trimmed by removing the top ½ to ¾ inch of the beets, blemishes and residual dirt retained in crevices. 201.1 lbs. of washed and trimmed beets were obtained.

The washed and trimmed beets were then processed in three separate batches. In Batch #1, 43.3 lbs. of the washed and trimmed beets were sliced into cossettes over a 26 minute period using a slicing machine equipped with two sets of Putsch knives. Immediately upon being cut the cossettes were immersed in 15 gallons of a 2% lime slurry recovered from Batch #2 of Example I. The cossettes acquired a greenish yellow appearance immediately upon immersion in the lime slurry. The lime slurry cooled from room temperature to 0° C. shortly after immersion of the cossettes. The cossettes remained in the lime slurry for 76 minutes, timed from immersion of the last cossette and were then pressed through a cheese cloth over a 2 minute period to remove excess lime slurry. 23.2 lbs. of pressed cossettes were obtained.

In Batch #2, 92.7 lbs. of the washed and trimmed beets were sliced into cossettes over a 30 minute period using the same slicing machine as used to slice Batch #1. Immediately upon being cut the cossettes were immersed in 11.5 gallons of a 2% lime slurry consisting of 5 gallons of lime slurry recovered from Batch #2 of Example I and 6.5 gallons of fresh 2% lime slurry. The cossettes acquired a greenish yellow appearance immediately upon immersion in the lime slurry. The lime slurry cooled from room temperature to 0° C. shortly after immersion of the cossettes. The cossettes remained in the lime slurry for 95 minutes, timed from immersion of the last cossette, and were then pressed through a cheese cloth over a 28 minute period to remove excess lime slurry. 131.9 lbs. of pressed cossettes were obtained.

In Batch #3, 65.1 lbs. of the washed and trimmed beets were sliced into cossettes over a 15 minute period using the same slicing machine used to slice Batch #1. Immediately upon being cut the cossettes were immersed in 12.5 gallons of a 2% lime slurry consisting of 10.5 gallons of lime slurry recovered from Batch #2 of Example I and 2 gallons of fresh 2% lime slurry. The cossettes acquired a greenish yellow appearance immediately upon immersion in the lime slurry. The lime slurry cooled from room temperature to 0° C. shortly after immersion of the cossettes. The cossettes remained in the lime slurry for 100 minutes, timed from immersion of the last cossette and were then pressed through a cheese cloth over a 30 minute period to remove excess lime slurry. 71.8 lbs. of pressed cossettes were obtained.

The total yield of pressed cossettes from Batches 1, 2 and 3 was 226.9 lbs.

All three batches were combined and then split again into three different batches of approximately equal weight. The first batch of lime treated cossettes was charged into a natural gas heated fluidized bed dryer and dried for 2.5 hours at an air inlet temperature of 150° C. The drying process was then repeated for Batches 2 and 3.

31.7 lbs. of a light-tan shredded product having a moisture content of 1 wt. % was produced. About 1 wt. % of this yield was obtained from the cyclone separator of the fluidized bed dryer.

EXAMPLE III

Calcium Enriched Sugar Beet Cossettes Sugar Retained

Frozen sugar beets were washed with a water spray in a roller drum washer wherein about 50% of the sugar beet peels were removed. The beets were then trimmed by removing the top ½ to ¾ inch of the beets, blemishes, and residual dirt retained in crevices. 191.6 lbs. of washed and trimmed beets were obtained.

The washed and trimmed beets were then processed in three separate batches. In Batch #1, 76.8 lbs. of the washed and trimmed beets were sliced into cossettes over an 11 minute period using the slicing machine equipped with two sets of Putsch knives. Immediately upon being cut, the cossettes were immersed in 12 gallons of a 2% lime slurry consisting of 10 gallons of lime slurry recovered from Example II and 2 gallons of fresh 2% lime slurry. The cossettes acquired a greenish yellow appearance immediately upon immersion in the lime slurry. The lime slurry cooled from room temperature to 0° C. shortly after immersion of the cossettes. The cossettes remained in the lime slurry for 16 minutes, timed from immersion of the first cossette, and were then pressed through a cheese cloth over a 39 minute period to remove excess lime slurry. 94.5 lbs. of pressed cossettes were obtained.

In Batch #2, 64.4 lbs. of the washed and trimmed beets were sliced into cossettes over a 12 minute period using the same slicing machine as used to slice Batch #1. Immediately upon being cut the cossettes were immersed in 11 gallons of a fresh 2% lime slurry. The cossettes acquired a greenish yellow appearance immediately upon immersion in the lime slurry. The lime slurry cooled from room temperature to 0° C. shortly after immersion of the cossettes. The cossettes remained in the lime slurry for 18 minutes, timed from immersion of the first cossette, and were then pressed through a cheese cloth over a 31 minute period to remove excess lime slurry. 69.2 lbs. of pressed cossettes were obtained.

In Batch #3, 50.4 lbs. of the washed and trimmed beets were sliced into cossettes over a 7 minute period using the same slicing machine used to slice Batch #1. Immediately upon being cut the cossettes were immersed in 11.4 gallons of a 2% lime slurry consisting of 8.4 gallons of lime slurry recovered from Batch #2 of Example III and 3 gallons of fresh 2% lime slurry. The cossettes acquired a greenish yellow appearance immediately upon immersion in the lime slurry. The lime slurry cooled from room temperature to 0° C. shortly after immersion of the cossettes. The cossettes remained in the lime slurry for 20 minutes, timed from immersion of the last cossette, and were then pressed through a cheese cloth over a 31 minute period to remove excess lime slurry. 64.1 lbs. of pressed cossettes were obtained.

The total yield of pressed cossettes from Batches 1, 2 and 3 was 227.8 lbs.

All three batches were combined and then split into three different batches of 62.8 lbs., 92.4 lbs., and 68.0 lbs. of pressed cossettes. The first batch of lime treated cossettes was charged into a natural gas heated fluidized bed dryer and dried for 2 hours at an air inlet temperature of 150° C. The drying process was then repeated for Batches 2 and 3 with a drying time of 2 hours.

31.5 lbs. of a brown shredded product having a moisture content of 1 wt. % was produced. About 0.3 wt. % of this yield was obtained from the cyclone separator of the fluidized bed dryer.

EXAMPLE IV

Calcium Enriched Sugar Beet Cossettes Sugar Retained

Frozen sugar beets were washed with a water spray in a roller drum washer wherein about 50% of the sugar beet peels were removed. The beets were then trimmed by removing the top ½ to ¾ inch of the beets, blemishes, and residual dirt retained in the crevices. 185.0 lbs. of washed and trimmed beets were obtained.

The washed and trimmed beets were then processed in 2 separate batches. In Batch #1, 91.5 lbs. of the washed and trimmed beets were sliced into cossettes over a 26 minute period using a slicing machine equipped with two sets of Putsch knives. Immediately upon being cut the cossettes were immersed in 15.9 gallons of a 2% lime slurry consisting of 8.9 gallons of lime slurry recovered from Batch #3 of Example III and 7 gallons of fresh 2% lime slurry. The cossettes acquired a greenish yellow appearance immediately upon immersion in the lime slurry. The lime slurry cooled from room temperature to 0° C. shortly after immersion of the cossettes. The cossettes remained in the lime slurry for 18 minutes, timed from immersion of the last cossette, and were then pressed through a cheese cloth over a 48 minute period to remove excess lime slurry. 103.6 lbs. of pressed cossettes were obtained.

In Batch #2, 93.5 lbs. of the washed and trimmed beets were sliced into cossettes over a 14 minute period using the same slicing machine used to slice Batch #1. Immediately upon being cut the cossettes were immersed in 15.5 gallons of a fresh 2% lime slurry. The cossettes acquired a greenish yellow appearance immediately upon immersion in the lime slurry. The lime slurry cooled from room temperature to 0° C. shortly after immersion of the cossettes. The cossettes remained in the lime slurry for 13 minutes, timed from immersion of the last cossette, and were then pressed through a cheese cloth over a 37 minute period to remove excess lime slurry. 99.4 lbs. of pressed cossettes were obtained.

The total yield of pressed cossettes from Batches #1 and #2 was 203.0 lbs.

Both batches were combined and then split again into three different batches weighing 52.8 lbs., 73.2 lbs., and 73.2 lbs. The first batch of lime treated cossettes was charged into a natural gas heated fluidized bed dryer and dried for 1.5 hours at an air inlet temperature of 150° C. The drying process was then repeated for Batches #2 and #3 with a drying time of 2 hours.

28.9 lbs. of a light brown product having a moisture content of 1 wt. % was produced. About 1 wt. % of this yield was obtained from the cyclone separator of the fluidized bed dryer.

EXAMPLE V

Iron Enriched Sugar Beet Cossettes Sugar Retained

Two lbs. of frozen sugar beet cossettes were immersed in 1 liter of a 0.3 wt. % ferric chloride solution. The cossettes acquired a darkened appearance upon immersion in the ferric chloride solution. The ferric chloride solution cooled from room temperature to 3°

C. shortly after immersion of the cossettes. The cossettes were immersed in the ferric chloride solution for 10 minutes and were then pressed through a cheese cloth to remove excess liquid from the cossettes. A convection type laboratory oven was used to dry the pressed sugar beet cossettes at a temperature of 90° C. for a period of 16 hours. 1.8 lbs. of dried iron enriched sugar beet cossettes having a moisture content of 4 wt. % were obtained.

EXAMPLE VI

Iron Enriched Sugar Beet Pulp Sugar Extracted 127.8 lbs. of frozen sugar beets were washed with a water spray in a roller drum washer wherein about 50% of the sugar beet peels were removed. The sugar beets were then trimmed by removing the top ½ to ¾ inches of the beet, blemishes, and residual dirt retained in crevices. 102.4 lbs. of washed and trimmed sugar beets were obtained.

The washed and trimmed beets were sliced into cossettes using a slicing machine equipped with 2 sets of Putsch knives and the sliced cossettes fed into a continuous extraction device to remove the sugar from the cossettes. Sugar was extracted from the cossettes in the continuous extraction device for 7 hours. Three gallons of a 1,000 part per million iron solution was then applied to the sugar beet pulp in the last section of the diffuser over a 7 hour period. The iron enriched pulp was dried in a fluidized bed dryer maintained at 150° C. 12 lbs. of dried iron enriched sugar beet pulp was produced having a moisture content of 4 wt. % and containing 3,000 parts per million iron.

EXAMPLE VII

Calcium Enriched High Fiber Cinnamon Rolls

The following recipe made calcium enriched cinnamon rolls having over 0.5 g. dietary fiber (60% neutral detergent fiber (NDF)) per roll, by using calcium-enriched sugar beet product made in accordance with the process of Examples I-IV.

| Ingredients | Amount (g.) |
| --- | --- |
| All purpose flour | 274 |
| Milk | 62 |
| Water | 58 |
| Egg | 56 |
| Margarine | 56 |
| Sugar | 27 |
| Gluten | 14 |
| Calcium-enriched sugar beet | 14 |
| Active dry yeast | 9 |
| Salt | 4 |
|  | 574 |
| Sugar | 54 |
| Margarine | 26 |
| Cinnamon | 4 |
|  | 84 |

The water was warmed to 110° F. and combined with the yeast. The flour, gluten and sugar beet were dry blended. Into the water and yeast was added the milk, 27 g. of the sugar, the salt, the eggs, 56 g. of the margarine and 150 g. of the flour, gluten, sugar beet blend. The mixture was blended with a hand held kitchen blender until smooth. The remaining 152 g. flour, gluten, sugar beet blend was then added to the mixture and worked into the mixture using a dough hook. The resultant dough was kneaded for 5 minutes, placed into a greased 2 liter beaker, covered, and placed in a proofing oven set at 100° F. (38° C.) for 1½ hours. The dough was punched down and rolled into a 15×9 inch rectangle. The remaining margarine, sugar and cinnamon were spread/sprinkled onto the rolled dough. Beginning at the wide side of the rectangle, the dough was rolled, sealed and cut into 15 rolls. The rolls were placed 2 inches apart in a greased 13 ×9×2 inch baking pan and allowed to rise for 1 hour. The rolls were baked at 375° F. (190° C.) for 30 minutes.

EXAMPLE VIII

Calcium Enriched High Fiber Muffins

The following recipe made calcium-enriched muffins having 1.1 g. of dietary fiber (60% neutral detergent fiber (NDF)) per muffin by using calcium-enriched sugar beet product made in accordance with the process of Examples I-IV.

| Ingredients | Amount (g.) |
| --- | --- |
| All purpose flour | 21.7 |
| Milk | 20.8 |
| Egg (beaten) | 4.6 |
| Vegetable oil | 4.6 |
| Sugar | 4.0 |
| Calcium enriched sugar beet | 1.1 (−20, +25 mesh) |
| Baking powder | 0.8 |
| Salt | 0.5 |
|  | 58.1 |

The milk, oil and egg were mixed. The remaining ingredients were dry blended and stirred into the liquid mixture until a moist batter was obtained. The batter was poured into a greased 2¾ inch diameter muffin cup and baked at 400° F. (205° C.) for 30 minutes. The resultant muffin had good height, structure, texture, and appearance.

EXAMPLE IX

Calcium Enriched High Fiber Muffins

The following recipe made calcium-enriched muffins having 1.1 g. of dietary fiber (60% neutral detergent fiber (NDF)) per muffin by using calcium-enriched sugar beet product made in accordance with the process of Examples I-IV.

| Ingredients | Amount (g.) |
| --- | --- |
| All purpose flour | 21.7 |
| Milk | 20.8 |
| Egg (beaten) | 4.6 |
| Vegetable oil | 4.6 |
| Sugar | 4.0 |
| Calcium enriched sugar beet | 1.1 (−25, +40 mesh) |
| Baking powder | 0.8 |
| Salt | 0.5 |
|  | 58.1 |

The milk, oil and beaten egg were mixed. The remaining ingredients were dry blended and stirred into the liquid mixture until a moist batter was obtained. The batter was poured into a greased 2¾ inch diameter muffin cup and baked at 400° F. (205° C.) for 30 minutes. The resultant muffin had good height, structure, texture, and appearance.

EXAMPLE X

Calcium Enriched High Fiber Muffins

The following recipe made calcium-enriched muffins having 1.1 g. of dietary fiber (60% neutral detergent fiber (NDF)) per muffin by using calcium-enriched sugar beet product made in accordance with the process of Examples I–IV.

| Ingredients | Amount (g.) | |
|---|---|---|
| All purpose flour | 21.7 | |
| Milk | 20.8 | |
| Egg (beaten) | 4.6 | |
| Vegetable oil | 4.6 | |
| Sugar | 4.0 | |
| Calcium enriched sugar beet | 1.1 | (−40, +60 mesh) |
| Baking powder | 0.8 | |
| Salt | 0.5 | |
| | 58.1 | |

The milk, oil and egg were mixed. The remaining ingredients were dry blended and stirred into the liquid mixture until a moist batter was obtained. The batter was poured into a greased 2¾ inch diameter muffin cup and baked at 400° F. (205° C.) for 30 minute. The resultant muffin had good height, structure, texture, and appearance.

EXAMPLE XI

Calcium Enriched High Fiber Muffins

The following recipe made calcium-enriched muffins having 1.1 g. of dietary fiber (60% neutral detergent fiber (NDF)) per muffin by using calcium-enriched sugar beet product made in accordance with the process of Example I–IV.

| Ingredients | Amount (g.) | |
|---|---|---|
| All purpose flour | 21.7 | |
| Milk | 20.8 | |
| Egg (beaten) | 4.6 | |
| Vegetable oil | 4.6 | |
| Sugar | 4.0 | |
| Calcium enriched sugar beet | 1.1 | (−60 mesh) |
| Baking powder | 0.8 | |
| Salt | 0.5 | |
| | 58.1 | |

The milk, oil and egg were mixed. The remaining ingredients were dry blended and stirred into the liquid mixture until a moist batter was obtained. The batter was poured into a greased 2¾ inch diameter muffin cup and baked at 400° F. (205° C.) for 30 minutes. The resultant muffin had good height, structure, texture, and appearance.

EXAMPLE XII

Calcium Enriched High Fiber Muffins

The following recipe made calcium-enriched muffins having 2.3 g. of dietary fiber (60% neutral detergent fiber (NDF)) per muffin by using calcium-enriched sugar beet ( 10 product made in accordance with the process of Examples I–IV.

| Ingredients | Amount (g.) | |
|---|---|---|
| All purpose flour | 20.5 | |
| Milk | 20.8 | |
| Egg (beaten) | 4.6 | |
| Vegetable oil | 4.6 | |
| Calcium enriched sugar beet | 2.3 | (−20, +25 mesh) |
| Baking powder | 0.8 | |
| Salt | 0.5 | |
| | 58.1 | |

The milk, oil and egg were mixed. The remaining ingredients were dry blended and stirred into the liquid mixture until a moist batter, was obtained. The batter was poured into a greased 2¾ inch diameter muffin cup and baked at 400° F. (205° C.) for 30 minutes. The resultant muffin had good height, structure, texture, and appearance.

EXAMPLE XIII

Calcium Enriched High Fiber Muffins

The following recipe made calcium-enriched muffins having 2.3 g. of dietary fiber (60% neutral detergent fiber (NDF)) per muffin by using calcium-enriched sugar beet product made in accordance with the process of Examples I–IV.

| Ingredients | Amount (g.) | |
|---|---|---|
| All purpose flour | 20.5 | |
| Milk | 20.8 | |
| Egg (beaten) | 4.6 | |
| Vegetable oil | 4.6 | |
| Sugar | 4.0 | |
| Calcium enriched sugar beet | 2.3 | (−25, +40 mesh) |
| Baking powder | 0.8 | |
| Salt | 0.5 | |
| | 58.1 | |

The milk, oil and egg were mixed. The remaining ingredients were dry blended and stirred into the liquid mixture until a moist batter was obtained. The batter was poured into a greased 2¾ inch diameter muffin cup and baked at 400° F. (205° C.) for 30 minutes. The resultant muffin had good height, structure, texture, and appearance.

EXAMPLE XIV

Calcium Enriched High Fiber Muffins

The following recipe made calcium-enriched muffins having 2.3 g. of dietary fiber (60% neutral detergent fiber (NDF)) per muffin by using calcium-enriched sugar beet product made in accordance with the process of Examples I–IV.

| Ingredients | Amount (g.) | |
|---|---|---|
| All purpose flour | 20.5 | |
| Milk | 20.8 | |
| Egg (beaten) | 4.6 | |
| Vegetable oil | 4.6 | |
| Sugar | 4.0 | |
| Calcium enriched sugar beet | 2.3 | (−40, +60 mesh) |
| Baking powder | 0.8 | |
| Salt | 0.5 | |
| | 58.1 | |

The milk, oil and egg were mixed. The remaining ingredients were dry blended and stirred into the liquid mixture until a moist batter was obtained. The batter was poured into a greased 2¾ inch diameter muffin cup and baked at 400° F. (205° C.) for 30 minutes. The resultant muffin had good height, structure, texture, and appearance.

EXAMPLE XV

Calcium Enriched High Fiber Muffins

The following recipe made calcium-enriched muffins having 2.3 g. of dietary fiber (60% neutral detergent fiber (NDF)) per muffin by using calcium-enriched sugar beet product made in accordance with the process of Examples I-IV.

| Ingredients | Amount (g.) |
| --- | --- |
| All purpose flour | 20.5 |
| Milk | 20.8 |
| Egg (beaten) | 4.6 |
| Vegetable oil | 4.6 |
| Sugar | 4.0 |
| Calcium enriched sugar beet | 2.3 (−60 mesh) |
| Baking powder | 0.8 |
| Salt | 0.5 |
|  | 58.1 |

The milk, oil and egg were mixed. The remaining ingredients were dry blended and stirred into the liquid mixture until a moist batter was obtained. The batter was poured into a greased 2¾ inch diameter muffin cup and baked at 400° F. (205° C.) for 30 minutes. The resultant muffin had good height, structure, texture, and appearance.

EXAMPLE XVI

Calcium Enriched High Fiber Muffins

The following recipe made calcium-enriched muffins having 4.6 g. of dietary fiber (60% neutral detergent fiber (NDF)) per muffin by using calcium-enriched sugar beet product made in accordance with the process of Examples I-IV.

| Ingredients | Amount (g.) |
| --- | --- |
| All purpose flour | 18.2 |
| Milk | 20.8 |
| Egg (beaten) | 4.6 |
| Vegetable oil | 4.6 |
| Sugar | 4.0 |
| Calcium enriched sugar beet | 4.6 (−20, +25 mesh) |
| Baking powder | 0.8 |
| Salt | 0.5 |
|  | 58.1 |

The milk, oil and egg were mixed. The remaining ingredients were dry blended and stirred into the liquid mixture until a moist batter was obtained. The batter was poured into a greased 2¾ inch diameter muffin cup and baked at 400° F. (205° C.) for 30 minutes. The resultant muffin had good height, structure, texture, and appearance.

EXAMPLE XVII

Calcium Enriched High Fiber Muffins

The following recipe made calcium-enriched muffins having 4.6 g. of dietary fiber (60% neutral detergent fiber (NDF)) per muffin by using calcium-enriched sugar beet product made in accordance with the process of Examples I-IV.

| Ingredients | Amount (g.) |
| --- | --- |
| All purpose flour | 18.2 |
| Milk | 20.8 |
| Egg (beaten) | 4.6 |
| Vegetable oil | 4.6 |
| Sugar | 4.0 |
| Calcium enriched sugar beet | 4.6 (−25, +40 mesh) |
| Baking powder | 0.8 |
| Salt | 0.5 |
|  | 58.1 |

The milk, oil and egg were mixed. The remaining ingredients were dry blended and stirred into the liquid mixture until a moist batter was obtained. The batter was poured into a greased 2¾ inch diameter muffin cup and baked at 400° F. (205° C.) for 30 minutes. The resultant muffin had good height, structure, texture, and appearance.

EXAMPLE XVIII

Calcium Enriched High Fiber Muffins

The following recipe made calcium-enriched muffins having 4.6 g. of dietary fiber (60% neutral detergent fiber (NDF)) per muffin by using calcium-enriched sugar beet product made in accordance with the process of Examples I-IV.

| Ingredients | Amount (g.) |
| --- | --- |
| All purpose flour | 18.2 |
| Milk | 20.8 |
| Egg (beaten) | 4.6 |
| Vegetable oil | 4.6 |
| Sugar | 4.0 |
| Calcium enriched sugar beet | 4.6 (−40, +60 mesh) |
| Baking powder | 0.8 |
| Salt | 0.5 |
|  | 58.1 |

The milk, oil and egg were mixed. The remaining ingredients were dry blended and stirred into the liquid mixture until a moist batter, was obtained. The batter was poured into a greased 2¾ inch diameter muffin cup and baked at 400° F. (205° C.) for 30 minutes. The resultant muffin had good height, structure, texture, and appearance.

EXAMPLE XIX

Calcium Enriched High Fiber Muffins

The following recipe made calcium-enriched muffins having 4.6 g. of dietary fiber (60% neutral detergent fiber (NDF)) per muffin by using calcium-enriched sugar beet product made in accordance with the process of Examples I-IV.

| Ingredients | Amount (g.) |
| --- | --- |
| All purpose flour | 18.2 |
| Milk | 20.8 |
| Egg (beaten) | 4.6 |
| Vegetable oil | 4.6 |
| Sugar | 4.0 |
| Calcium enriched sugar beet | 4.6 (−60 mesh) |
| Baking powder | 0.8 |

| Ingredients | Amount (g.) |
|---|---|
| Salt | 0.5 |
|  | 58.1 |

The milk, oil and egg were mixed. The remaining ingredients were dry blended and stirred into the liquid mixture until a moist batter was obtained. The batter was poured into a greased 2¾ inch diameter muffin cup and baked at 400° F. (205° C.) for 30 minutes. The resultant muffin had good height, structure, texture, and appearance.

EXAMPLE XX

Iron Enriched High Fiber Bread

The following recipe made a loaf of iron-enriched white bread having 0.5 g. dietary fiber (60% neutral detergent fiber (NDF)) per slice, by using with iron-enriched sugar beet product made in accordance with the process of Example V.

| Ingredients | Amount (g.) |
|---|---|
| All purpose flour | 321 |
| Water | 176 |
| Milk | 62 |
| Margarine | 22 |
| Sugar | 20 |
| Gluten | 13.5 |
| Iron enriched sugar beet | 13.5 (−80, +120 mesh) |
| Salt | 8 |
| Active dry yeast | 4.5 |
|  | 640.5 |

The milk was cooked until scalded. The sugar, salt and margarine were stirred into the scalded milk. The mixture was then allowed to cool until lukewarm. The water was warmed to 110° F. and combined with the yeast. The two liquid mixtures were then combined. The flour, gluten and sugar beet were dry blended and 275 grams thereof added to the liquid mixture to form a batter. The batter was mixed with a dough hook at #2 speed until well blended (1 minute). The remaining flour, gluten, sugar beet blend was added to the batter and mixed with the same dough hook until the batter clung to the dough hook and cleaned the sides of the mixing bowl (2 minutes). The resultant dough was then kneaded for 8 minutes, placed into a greased 2-liter beaker, covered and placed in a proofing oven at 100° F. (38°) C. for 1 hour. The dough was punched down and allowed to rest for 15 minutes. The dough was then shaped into a loaf, placed into a greased 9×5×3 inch loaf pan and returned to the proofing oven set at 100° F. for an additional hour. The loaf was then baked at 400° F. (205° C.) for 30 minutes, resulting in an 11% bake loss. The finished product had a height of 9.8 cm, moisture content of 29% on an as-consumed basis, and had good structure, texture, appearance and overall quality. The flavor was comparable to conventional white bread, although somewhat more dense in structure. Each slice provided 5.8 mg. iron, equivalent to 58% of the U.S. RDA for men, 32% for women; compared to 4% for men in conventional white bread, and 8% for men in conventional wheat bread.

EXAMPLE XXI

Iron Enriched High Fiber Bread

The following recipe made a loaf of iron-enriched white bread having 1.5 g. dietary fiber (60% neutral detergent fiber (NDF)) per slice, by using iron-enriched sugar beet product made in accordance with the process of Examples V.

| Ingredients | Amount (g.) |
|---|---|
| All purpose flour | 321 |
| Water | 183 |
| Milk | 62 |
| Margarine | 22 |
| Sugar | 20 |
| Gluten | 27 |
| Iron enriched sugar beet | 27 (−80, +120 mesh) |
| Salt | 8 |
| Active dry yeast | 4.5 |
|  | 674.5 |

The milk was cooked until scalded. The sugar, salt and margarine were stirred into the scalded milk. The mixture was then allowed to cool until lukewarm. The water was warmed to 110° F. and combined with the yeast. The two liquid mixtures were then combined. The flour, gluten and sugar beet were dry blended and 275 grams thereof added to the liquid mixture to form a batter. The batter was mixed with a dough hook at #2 speed until well blended (1 minute). The remaining flour, gluten, sugar beet blend was added to the batter and mixed with the same dough hook until the batter clung to the dough hook and cleaned the sides of the mixing bowl (2 minutes). The resultant dough was then kneaded for 8 minutes, placed into a greased 2-liter beaker, covered and placed in a proofing oven at 100° F. (38°) C. for 1 hour. The dough was punched down and allowed to rest for 15 minutes. The dough was then shaped into a loaf, placed into a greased 9×5×3 inch loaf pan and returned to the proofing oven set at 100° F. for an additional hour. The loaf was then baked at 400° F. (205° C.) for 30 minutes, resulting in an 8% bake loss. The finished product had a height of 11.4 cm, moisture content of 33% on an as-consumed basis, and had good structure, texture, appearance and overall quality. The flavor was comparable to conventional white bread, although somewhat more dense in structure. Each slice provided 8.6 mg. iron, equivalent to 86% of the U.S. RDA for men, 48% for women; compared to 4% for men in conventional white bread, and 8% for men in conventional wheat bread.

EXAMPLE XXII

Iron Enriched High Fiber Bread

The following recipe made a loaf of iron-enriched white bread having 1.5 g. dietary fiber (60% neutral detergent fiber (NDF)) per slice, by using iron-enriched sugar beet product made in accordance with the process of Examples V.

| Ingredients | Amount (g.) |
|---|---|
| All purpose flour | 321 |
| Water | 190 |
| Milk | 62 |
| Margarine | 22 |
| Sugar | 20 |

| Ingredients | Amount (g.) |
|---|---|
| Gluten | 40.5 |
| Iron enriched sugar beet | 40.5 (−80, +120 mesh) |
| Salt | 8 |
| Active dry yeast | 4.5 |
| | 708.5 |

The milk was cooked until scalded. The sugar, salt and margarine were stirred into the scalded milk. The mixture was then allowed to cool until lukewarm. The water was warmed to 110° F. and combined with the yeast. The two liquid mixtures were then combined. The flour, gluten and sugar beet were dry blended and 275 grams thereof added to the liquid mixture to form a batter. The batter was mixed with a dough hook at #2 speed until well blended (1 minute). The remaining flour, gluten, sugar beet blend was added to the batter and mixed with the same dough hook until the batter clung to the dough hook and cleaned the sides of the mixing bowl (2 minutes). The resultant dough was then kneaded for 8 minutes, placed into a greased 2-liter beaker, covered and placed in a proofing oven at 100° F. (38°) C. for 1 hour. The dough was punched down and allowed to rest for 15 minutes. The dough was then shaped into a loaf, placed into a greased 9×5×3 inch loaf pan and returned to the proofing oven set at 100° F. for an additional hour. The loaf was then baked at 400° F. (205° C.) for 30 minutes, resulting in an 8% bake loss. The finished product had a height of 11.6 cm, moisture content of 30% on an as-consumed basis, and had good structure, texture, appearance and overall quality. The flavor was comparable to conventional white bread, although somewhat more dense in structure. Each slice provided 13.1 mg. iron, equivalent to 131% of the U.S. RDA for men, 73% for women; compared to 4% for men in conventional white bread, and 8% for men in conventional wheat bread.

EXAMPLE XXIII

Iron Enriched High Fiber Bread

The following recipe made a loaf of iron-enriched white bread having 2.0 g. dietary fiber (60% neutral detergent fiber (NDF)) per slice, by using iron-enriched sugar beet product made in accordance with the process of Examples V.

| Ingredients | Amount (g.) |
|---|---|
| All purpose flour | 321 |
| Water | 195 |
| Milk | 62 |
| Margarine | 22 |
| Sugar | 20 |
| Gluten | 54 |
| Iron enriched sugar beet | 54 (−80, +120 mesh) |
| Salt | 8 |
| Active dry yeast | 4.5 |
| | 740.5 |

The milk was cooked until scalded. The sugar, salt and margarine were stirred into the scalded milk. The mixture was then allowed to cool until lukewarm. The water was warmed to 110° F. and combined with the yeast. The two liquid mixtures were then combined. The flour, gluten and sugar beet were dry blended and 275 grams thereof added to the liquid mixture to form a batter. The batter was mixed with a dough hook at #2 speed until well blended (1 minute). The remaining flour, gluten, sugar beet blend was added to the batter and mixed with the same dough hook until the batter clung to the dough hook and cleaned the sides of the mixing bowl (2 minutes). The resultant dough was then kneaded for 8 minutes, placed into a greased 2-liter beaker, covered and placed in a proofing oven at 100° F. (38°) C. for 1 hour. The dough was punched down and allowed to rest for 15 minutes. The dough was then shaped into a loaf, placed into a greased 9×5×3 inch loaf pan and returned to the proofing oven set at 100° F. for an additional hour. The loaf was then baked at 400° F. (205° C.) for 30 minutes, resulting in an 11% bake loss. The finished product had a height of 13.1 cm, moisture content of 30% on an as-consumed basis, and had good structure, texture, appearance and overall quality. The flavor was comparable to conventional white bread, although somewhat more dense in structure. Each slice provided 17.6 mg. iron, equivalent to 176% of the U.S. RDA for men, 98% for women; compared to 4% for men in conventional white bread, and 8% for men in conventional wheat bread.

EXAMPLE XXIV

Calcium Enriched High Fiber Bread

The following recipe made a loaf of calcium-enriched white bread having 0.5 g. dietary fiber (60% neutral detergent fiber (NDF)) per slice, by using calcium-enriched sugar beet product made in accordance with the process of Examples I-IV.

| Ingredients | Amount (g.) |
|---|---|
| All purpose flour | 321 |
| Water | 169 |
| Milk | 62 |
| Margarine | 22 |
| Sugar | 20 |
| Gluten | 13.5 |
| Calcium enriched sugar beet | 13.5 (−80, +120 mesh) |
| Salt | 8 |
| Active dry yeast | 4.5 |
| | 633.5 |

The milk was cooked until scalded. The sugar, salt and margarine were stirred into the scalded milk. The mixture was then allowed to cool until lukewarm. The water was warmed to 110° F. and combined with the yeast. The two liquid mixtures were then combined. The flour, gluten and sugar beet were dry blended and 275 grams thereof added to the liquid mixture to form a batter. The batter was mixed with a dough hook at #2 speed until well blended (1 minute). The remaining flour, gluten, sugar beet blend was added to the batter and mixed with the same dough hook until the batter clung to the dough hook and cleaned the sides of the mixing bowl (2 minutes). The resultant dough was then kneaded for 8 minutes, placed into a greased 2-liter beaker, covered and placed in a proofing oven at 100° F. (38°) C. for 1 hour. The dough was punched down and allowed to rest for 15 minutes. The dough was then shaped into a loaf, placed into a greased 9×5×3 inch loaf pan and returned to the proofing oven set at 100° F. for an additional hour. The loaf was then baked at 400° F. (205° C.) for 30 minutes, resulting in an 11% bake loss. The finished product had a height of 10.6 cm, moisture content of 25% on an as-consumed basis, and had good structure, texture, appearance and overall quality. The flavor was comparable to conventional white bread, although somewhat more dense in structure. Each slice provided 120 mg. calcium, equivalent to 15% of the U.S. RDA for men, 10% for women; compared to 2% for men in conventional white bread, and 4% for men in conventional wheat bread.

EXAMPLE XXV

Calcium Enriched High Fiber Bread

The following recipe made a loaf of calcium-enriched white bread having 1.0 g. dietary fiber (60% neutral detergent fiber (NDF)) per slice, by using calcium-enriched sugar beet product made in accordance with the process of Examples I-IV.

| Ingredients | Amount (g.) |
| --- | --- |
| All purpose flour | 321 |
| Water | 169 |
| Milk | 62 |
| Margarine | 22 |
| Sugar | 20 |
| Gluten | 27 |
| Calcium enriched sugar beet | 27 (−80, +120 mesh) |
| Salt | 8 |
| Active dry yeast | 4.5 |
| | 667.5 |

The milk was cooked until scalded. The sugar, salt and margarine were stirred into the scalded milk. The mixture was then allowed to cool until lukewarm. The water was warmed to 110° F. and combined with the yeast. The two liquid mixtures were then combined. The flour, gluten and sugar beet were dry blended and 275 grams thereof added to the liquid mixture to form a batter. The batter was mixed with a dough hook at #2 speed until well blended (1 minute). The remaining flour, gluten, sugar beet blend was added to the batter and mixed with the same dough hook until the batter clung to the dough hook and cleaned the sides of the mixing bowl (2 minutes). The resultant dough was then kneaded for 8 minutes, placed into a greased 2-liter beaker, covered and placed in a proofing oven at 100° F. (38°) C. for 1 hour. The dough was punched down and allowed to rest for 15 minutes. The dough was then shaped into a loaf, placed into a greased 9×5×3 inch loaf pan and returned to the proofing oven set at 100° F. for an additional hour. The loaf was then baked at 400° F. (205° C.) for 30 minutes, resulting in an 8% bake loss. The finished product had a height of 9.9 cm, moisture content of 24% on an as-consumed basis, and had good structure, texture, appearance and overall quality. The flavor was comparable to conventional white bread, although somewhat more dense in structure. Each slice provided 186 mg. calcium, equivalent to 23% of the U.S. RDA for men, 16% for women; compared to 2% for men in conventional white bread, and 4% for men in conventional wheat bread.

EXAMPLE XXVI

Calcium Enriched High Fiber Bread

The following recipe made a loaf of calcium-enriched white bread having 1.5 g. dietary fiber (60% neutral detergent fiber (NDF)) per slice, by using calcium-enriched sugar beet product made in accordance with the process of Examples I-IV.

| Ingredients | Amount (g.) |
| --- | --- |
| All purpose flour | 321 |
| Water | 183 |
| Milk | 62 |
| Margarine | 22 |
| Sugar | 20 |
| Gluten | 40.5 |
| Calcium enriched sugar beet | 40.5 (−80, +120 mesh) |
| Salt | 8 |
| Active dry yeast | 4.5 |
| | 701.5 |

The milk was cooked until scalded. The sugar, salt and margarine were stirred into the scalded milk. The mixture was then allowed to cool until lukewarm. The water was warmed to 110° F. and combined with the yeast. The two liquid mixtures were then combined. The flour, gluten and sugar beet were dry blended and 275 grams thereof added to the liquid mixture to form a batter. The batter was mixed with a dough hook at #2 speed until well blended (1 minute). The remaining flour, gluten, sugar beet blend was added to the batter and mixed with the same dough hook until the batter clung to the dough hook and cleaned the sides of the mixing bowl (2 minutes). The resultant dough was then kneaded for 8 minutes, placed into a greased 2-liter beaker, covered and placed in a proofing oven at 100° F. (38°) C. for 1 hour. The dough was punched down and allowed to rest for 15 minutes. The dough was then shaped into a loaf, placed into a greased 9×5×3 inch loaf pan and returned to the proofing oven set at 100° F. for an additional hour. The loaf was then baked at 400° F. (205° C.) for 30 minutes, resulting in an 7% bake loss. The finished product had a height of 11.3 cm, moisture content of 24% on an as-consumed basis, and had good structure, texture, appearance and overall quality. The flavor was comparable to conventional white bread, although somewhat more dense in structure. Each slice provided 232 mg. calcium, equivalent to 29% of the U.S. RDA for men, 19% for women; compared to 2% for men in conventional white bread, and 4% for men in conventional wheat bread.

EXAMPLE XXVII

Calcium Enriched High Fiber Bread

The following recipe made a loaf of calcium-enriched white bread having 2.0 g. dietary fiber (60% neutral detergent fiber (NDF)) per slice, by using calcium-enriched sugar beet product made in accordance with the process of Examples I-IV.

| Ingredients | Amount (g.) |
| --- | --- |
| All purpose flour | 321 |
| Water | 190 |
| Milk | 62 |
| Margarine | 22 |
| Sugar | 20 |
| Gluten | 54 |
| Calcium enriched sugar beet | 54 (−80, +120 mesh) |
| Salt | |
| Active dry yeast | 4.5 |
| | 735.5 |

The milk was cooked until scalded. The sugar, salt and margarine were stirred into the scalded milk. The mixture was then allowed to cool until lukewarm. The water was warmed to 110° F. and combined with the yeast. The two liquid mixtures were then combined. The flour, gluten and sugar beet were dry blended and 275 grams thereof added to the liquid mixture to form a batter. The batter was mixed with a dough hook at #2 speed until well blended (1 minute). The remaining flour, gluten, sugar beet blend was added to the batter and mixed with the same dough hook until the batter clung to the dough hook and cleaned the sides of the mixing bowl (2 minutes). The resultant dough was then kneaded for 8 minutes, placed into a greased 2-liter beaker, covered and placed in a proofing oven at 100° F. (38°) C. for 1 hour. The dough was punched down and allowed to rest for 15 minutes. The dough was then shaped into a loaf, placed into a greased 9×5×3 inch loaf pan and returned to the proofing oven set at 100° F. for an additional hour. The loaf was then baked at 400° F. (205° C.) for 30 minutes, resulting in an 7% bake loss. The finished product had a height of 11.4 cm, moisture content of 29% on an as-consumed basis, and had good structure, texture, appearance and overall quality. The flavor was comparable to conventional white bread, although somewhat more dense in structure. Each slice provided 305 mg. calcium, equivalent to 38% of the U.S. RDA for men, 25% for women; compared to 2% for men in conventional white bread, and 4% for men in conventional wheat bread.

The specification and Examples above are presented to aid in complete nonlimiting understanding of the invention. Since many variations and embodiments of the invention can be made without departing from the spirit and scope of the invention, the invention resides in the claims hereinafter appended.

I claim:

1. A mineral enriched dietary fiber product prepared according to a process including the steps of:
   (a) treating pieces of whole, unprocessed, sugar beet with a source of mineral selected from the group consisting of iron, magnesium, copper, zinc, manganese, potassium, calcium and combinations thereof at a sufficient temperature and for an effective length of time such that the sugar beet pieces absorb and retain at least a portion of the mineral to form mineral-enriched sugarbeet pieces; and,
   (b) milling the mineral-enriched sugar beet pieces to form a milled composition;
      (i) said milling being conducted to yield a milled mineral-enriched dietary composition without any prior step of reacting the mineral-enriched sugar beet pieces with a chemical composition to chemically modify the nature of the absorbed mineral therein.

2. A product-by-process as described in claim 1 wherein:
   (a) said source of mineral includes a source of iron; and,
   (b) said step of treating is conducted sufficiently long such that the mineral-enriched sugar beet composition is supplemented with at least about 0.2 to 0.4 wt. % iron.

3. A product-by-process as described in claim 1 wherein:
   (a) said source of mineral includes a source of magnesium; and,
   (b) said step of treating is conducted sufficiently long such that the mineral-enriched sugar beet composition is supplemented with at least about 1 to 2 wt. % magnesium.

4. A product-by-process as described in claim 1 wherein:
   (a) said source of mineral includes a source of copper; and,
   (b) said step of treating is conducted sufficiently long such that the mineral-enriched sugar beet composition is supplemented with at least about 0.1 to 0.3 wt. % copper.

5. A product-by-process as described in claim 1 wherein:
   (a) said source of mineral includes a source of zinc; and,
   (b) said step of treating is conducted sufficiently long such that the mineral-enriched sugar beet composition is supplemented with at least about 0.1 to 0.3 wt. % zinc.

6. A product-by-process as described in claim 1 wherein:
   (a) said source of mineral includes a source of manganese; and,
   (b) said step of treating is conducted sufficiently long such that the mineral-enriched sugar beet composition is supplemented with at least about 0.1 to 0.3 wt. % manganese.

7. A product-by-process as described in claim 1 wherein:
   (a) said source of mineral includes a source of potassium; and,
   (b) said step of treating is conducted sufficiently long such that the mineral-enriched sugar beet composition is supplemented with at least about 2 to 4 wt. % potassium.

8. A product-by-process as described in claim 1 wherein:
   (a) said pieces of whole, unprocessed, sugar beet comprise slices of sugar beets.

9. A product-by-process as described in claim 1 wherein:
   (a) said pieces of whole, unprocessed, sugar beet comprise unsliced sugar beets.

10. A product-by-process as described in claim 1 wherein said step of combining sugar beet pieces with a source of mineral is conducted at a temperature no greater than about 50° C.

11. A product-by-process as described in claim 1 wherein said step of combining sugar beet pieces with a source of mineral is conducted at a temperature no greater than about 30° C.

12. A product-by-process as described in claim 1 wherein:
   (a) said step of combining includes combining said pieces of sugar beet and said source of mineral in an aqueous environment; and,
   (b) said process includes steps of:
      (i) removing said mineral-enriched sugar beet pieces from said aqueous environment;
      (ii) removing excess liquid from said mineral-enriched sugar beet pieces; and,
      (iii) drying said mineral-enriched sugar beet pieces to a moisture content of less than about 10 wt. %, based upon the weight of the sugar beet pieces after drying.

13. A product-by-process as described in claim 1 wherein:
   (a) said source of mineral includes a source of calcium; and,
   (b) said step of treating is conducted sufficiently long such that the mineral-enriched sugar beet composition is supplemented with at least about 2 wt. % calcium.

14. A mineral-enriched dietary product prepared according to a process including the steps of:
(a) treating pieces of processed sugar beet in an aqueous solution of an inorganic salt of a mineral selected from the group consisting of iron, magnesium, copper, zinc, manganese, potassium, calcium and combinations thereof at a temperature of less than about 50° C. and for an effective length of time such that the sugar beet pieces absorb and retain at least a portion of the mineral to form mineral-enriched sugar beet pieces; and,
(b) milling the mineral-enriched sugar beet pieces to form a milled, powdered, composition;
    (i) said milling being conducted to yield the milled mineral-enriched dietary composition without any prior step of reacting the mineral-enriched sugar beet pieces with a chemical composition to chemically modify the nature of the absorbed mineral therein.

15. A product-by-process as described in claim 14 wherein said step of combining sugar beet pieces comprises combining sugar beet pulp.

16. A product-by-process as described in claim 14 wherein said process includes the steps of:
(a) removing said mineral-enriched sugar beet pieces from said aqueous solution;
(b) removing excess liquid from said mineral-enriched sugar beet pieces; and,
(c) drying said mineral-enriched sugar beet pieces to a moisture content of less than about 10 wt. %, based upon the weight of the sugar beet pieces after drying.

17. A dietary fiber product comprising a milled, powdered, composition of processed sugar beet including:
(a) less than about 10 wt. % moisture;
(b) absorbed mineral enhancement of mineral selected from the group consisting of iron, magnesium, copper, zinc, manganese, potassium, calcium and mixtures thereof, each mineral, when present, being present in the following amount:
    (i) at least about 0.2 to 0.4 wt. % iron;
    (ii) at least about 1 to 2 wt. % magnesium;
    (iii) at least about 0.1 to 0.3 wt. % copper;
    (iv) at least about 0.1 to 0.3 wt. % zinc;
    (v) at least about 0.1 to 0.3 wt. % manganese;
    (vi) at least about 2 to 4 wt. % potassium; and,
    (vii) at least about 2 wt. % calcium.

18. A dietary fiber product comprising a milled composition of unprocessed sugar beet including:
(a) less than about 10 wt. % moisture; and,
(b) absorbed mineral enhancement of mineral selected from the group consisting of iron, magnesium, copper, zinc, manganese, potassium, calcium and mixtures thereof, each mineral, when present, being present in the following amount:
    (i) at least about 0.2 to 0.4 wt. % iron;
    (ii) at least about 1 to 2 wt. % magnesium;
    (iii) at least about 0.1 to 0.3 wt. % copper;
    (iv) at least about 0.1 to 0.3 wt. % zinc;
    (v) at least about 0.1 to 0.3 wt. % manganese;
    (vi) at least about 2 to 4 wt. % potassium; and,
    (vii) at least about 2 wt. % calcium.

* * * * *